Sept. 24, 1929.　　　J. S. NEWMAN　　　1,729,518
EDUCATIONAL DEVICE
Filed April 25, 1928　　2 Sheets-Sheet 1

Inventor
Joseph S. Newman
By Hull, Brock & West
Attorneys

Sept. 24, 1929.  J. S. NEWMAN  1,729,518
EDUCATIONAL DEVICE
Filed April 25, 1928  2 Sheets-Sheet 2
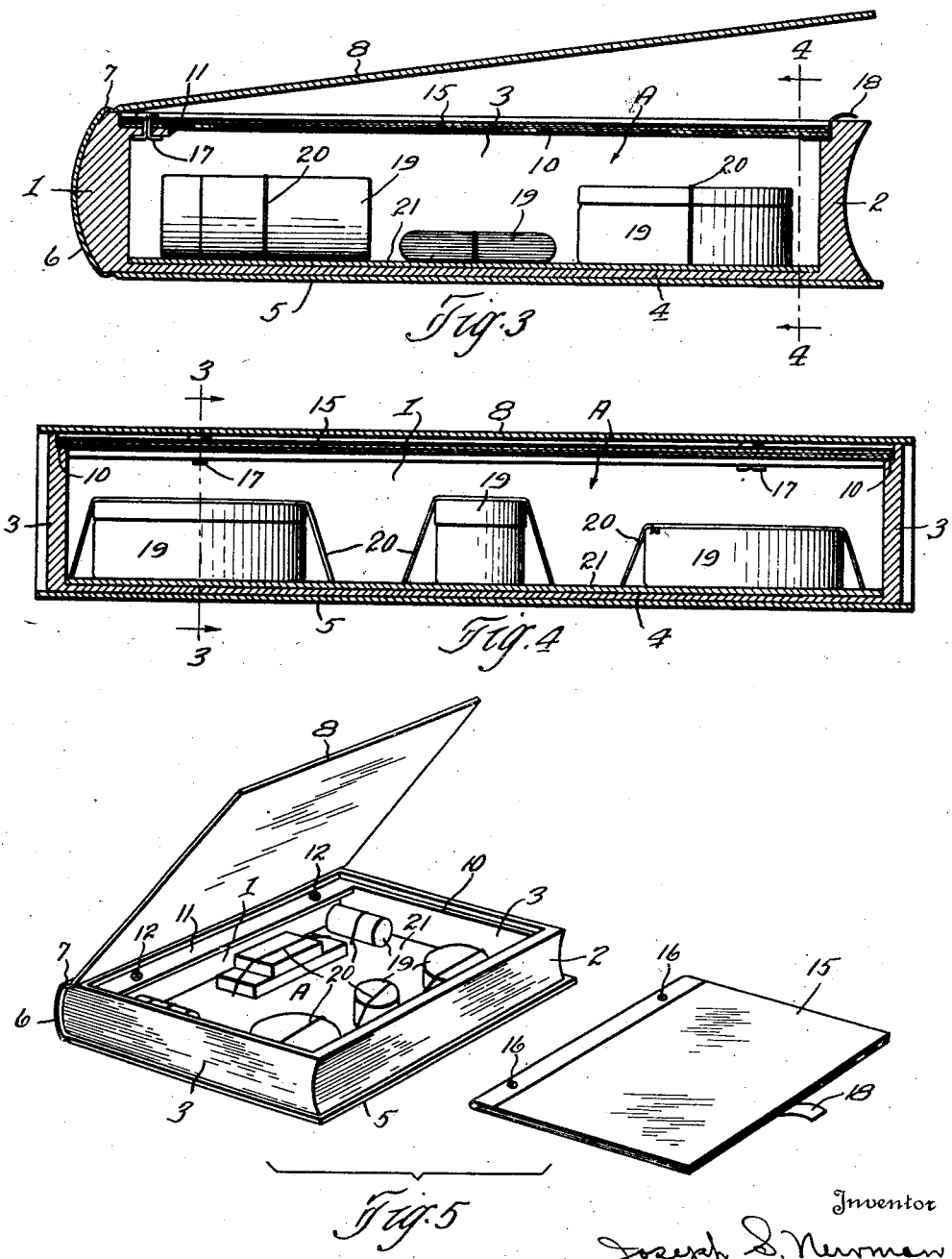

Patented Sept. 24, 1929

1,729,518

UNITED STATES PATENT OFFICE

JOSEPH S. NEWMAN, OF CLEVELAND, OHIO

EDUCATIONAL DEVICE

Application filed April 25, 1928. Serial No. 272,650.

The purpose of my invention is to provide an educational device that is highly instructive; that is very appealing to the class of users for which it is intended; and that has marked commercial advantages and possibilities.

The device is what I choose to call a "book-box", in that it consists of a combination book and box. It has the appearance of a book, and is capable of being used, handled, and treated in every way like an ordinary book. The device is intended especially for youths, and it incorporates a batch of leaves (preferably removable as a unit from the binding) containing reading matter pertaining to a given subject, and a box or container in which are adapted to be enclosed objects to which said reading matter has reference. For example, the reading matter may pertain to the subject of "telephony", in which case the volume is appropriately titled, while said leaves may bear an historical sketch of the subject, a description of telephone systems and instruments, a list of experiments pertaining to telephony, and finally instructions on how to construct a telephone instrument. The materials for such experiments, and the parts whereof the telephone instrument is to be made, will be contained in the box for ready reference and use.

Other subjects, such as electricity, telegraphy, chemistry, botany, sewing, embroidery and the like may be similarly treated.

By this invention, the selected subjects are presented in an especially attractive and absorbing manner, and object lessons and actual experiments are made possible at the minimum of expense and trouble. A convenient place for the physical exhibits, materials and apparatus is provided by the box or container which makes them instantly available and at all times keeps them together and with the literature relating thereto. The device may be kept in a bookcase, bookrack, or any other such place, the same as an ordinary volume.

From a merchandising standpoint, the invention provides a commodity that may be sold in bookstores as well as in toy and other stores, thus opening up an unusually wide field for outfits of this character.

Figure 1:
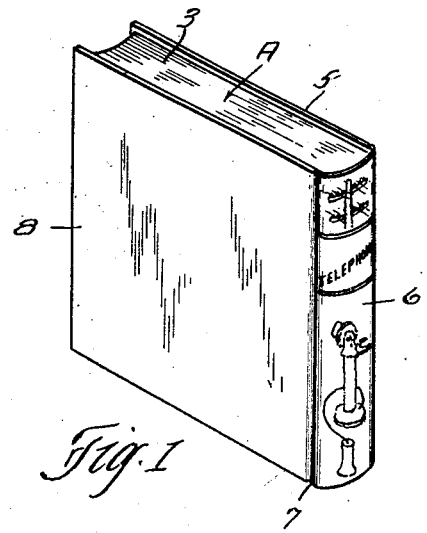
Figure 2:
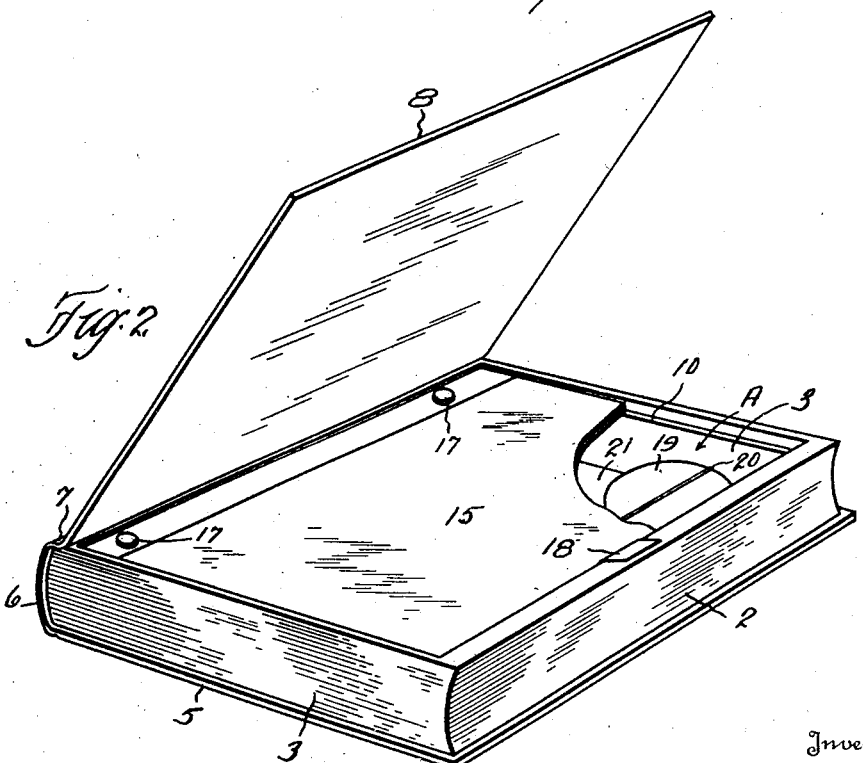

An embodiment of the invention is illustrated in the accompanying drawings wherein Figs. 1 and 2 are perspective views of the devices, the latter being on a scale considerably enlarged over that of the former, and showing the cover partially open and a part of the batch of leaves broken away to disclose certain structural features; Fig. 3 is a transverse section through the device, the same being taken on the line 3—3 of Fig. 4 and showing the cover slightly lifted; Fig. 4 is a longitudinal section on the line 4—4 of Fig. 3, with the cover closed; and Fig. 5 is a perspective view showing the batch of leaves removed from the binding that incorporates the container.

The box or container, designated generally by the reference character A, is made up of a back 1, front 2, end walls 3, and a bottom 4. These parts may be constructed of any suitable material, the back 1 and front 2 being preferably of wood, while the other parts may be of heavy cardboard or the like. A cover 5 of suitable material is preferably permanently secured to the bottom 4, as by gluing, and a portion 6 that is formed with said cover is likewise secured across the outer curved surface of the back 1 and is flexibly joined at 7 to a cover 8 that may be opened and closed by reason of its flexible connection with the portion 6. The front 2 has its outer surface concaved transversely so as to more closely resemble the corresponding portion of the book, and the exposed surfaces of the end walls 3 and the front 2 are desirably covered with a paper or other suitable material that is marked with fine lines so as to make said surfaces appear like the edges of leaves. The end walls 3 and the front 2 are rabbeted along their inner top edges to provide a ledge or shoulder 10 that is flush with the top surface of a flange 11 that extends along the inner top edge of the back 1 and is provided with apertures 12.

A suitably bound batch of leaves, designated 15, and which, for convenience, will be referred to as a booklet, fits within the top of the box or container A with its edges resting upon the ledge or shoulder 10 and the flange 11. Adjacent its rear edge said booklet has apertures 16 which are arranged to align with the apertures 12 of said flange, and fastening devices 17 are adapted to be engaged through the apertures 16 and 12 for removably holding the booklet in place. A tab 18 is attached to the back page or cover of the booklet and when the booklet is in normal position extends upwardly and over the top of the front 2 so that it may be conveniently grasped for withdrawing the open side of the booklet from its place within the box or container.

The pages of the booklet contain reading matter pertaining to the subject designated by the title appearing on the exterior of the device, as "Telephony," for example, and such reading matter may consist of an historical sketch of the subject, descriptions of telephone systems and instruments, a list of experiments, and finally instructions on how to construct a telephone. Materials and parts for carrying out the experiments and designated generally by the reference numeral 19 may be housed within the container A and, in the original instance—i. e., when the device is first made—may be attached, as by cords 20, to a removable bottom 21 that is placed within the container.

Thus it will be seen that my invention provides a device that has marked commercial advantages in that it is appropriate for sale by dealers in widely varied lines of merchandise; and it is highly educational since it so closely associates the objects with the reading matter pertaining thereto, and, for this same reason, the device is especially entertaining.

Having thus described my invention, what I claim is:—

1. As a new article of manufacture, a structure having the appearance of a bound volume and including a back and opposed covers, an open top container occupying the space between said covers, the open top of the container being recessed, and a booklet occupying the recessed open top of the container and serving as a closure for the container.

2. As a new article of manufacture, a structure having the appearance of a bound volume and including a back and opposed covers, an open top container occupying the space between said covers, the open top of the container being recessed, a booklet occupying the recessed open top of the container and serving as a closure for the container, and means removably securing the booklet within the structure.

3. As a new article of manufacture, a structure having the appearance of a bound volume and including a back and opposed covers, an open top container incorporated in the structure and having its open top disposed adjacent one of the covers, the last mentioned cover being hingedly connected to the back, a flange extending along the top of the container adjacent the hinged edge of the cover and inset within the container, other walls of the container having ledges in the plane of said flange, and a booklet resting at its edges upon said flange and ledges.

4. As a new article of manufacture, a structure having the appearance of a bound volume and including a back and opposed covers, an open top container incorporated in the structure and having its open top disposed adjacent one of the covers, the last mentioned cover being hingedly connected to the back, a flange extending along the top of the container adjacent the hinged edge of said cover and inset within the container, other walls of the container having ledges in the plane of said flange, a booklet resting at its edges upon said flange and ledges, and means detachably connecting the booklet to said flange.

5. As a new article of manufacture, a structure having the appearance of a bound volume and comprising a back, front, end walls and a bottom wall, a cover secured to the bottom wall, a second cover hingedly connected to the back in opposed relation to the first mentioned cover, the upper edges of the end walls being rabbeted on their inner sides to provide ledges, a flange extending along the inner side of the back and having its upper surface substantially in the plane of said ledges, and a booklet resting upon the aforesaid ledges and said flange.

6. As a new article of manufacture, a structure having the appearance of a bound volume and comprising a back, front, end walls and a bottom wall, the outer surface of the back being convex transversely and the outer surface of the front being concave transversely, a cover secured to the bottom wall, a second cover hingedly connected to the back in opposed relation to the first mentioned cover, the upper edges of the front and end walls being rabbeted on their inner sides to provide ledges, a flange extending along the inner side of the back and having its upper surface substantially in the plane of said ledges, and a booklet having its edges resting upon the aforesaid ledges and said flange.

7. As a new article of manufacture, a structure having the appearance of a bound volume and comprising a back, front, end walls and a bottom wall, a cover secured to the bottom wall, a second cover hingedly connected to the back in opposed relation to the first mentioned cover, the upper edges of the front and end walls being rabbeted on their inner sides to provide ledges, a flange extending along the inner side of the back and having its upper surface substantially in the plane of said ledges, a booklet having its edges resting upon the aforesaid ledges and said flange, and fastening means removably connecting said booklet to said flange.

In testimony whereof, I hereunto affix my signature.

JOSEPH S. NEWMAN.